United States Patent [19]
Pagel

[11] 3,710,618
[45] Jan. 16, 1973

[54] TORQUE SENSING INSTRUMENTS
[75] Inventor: Armin B. Pagel, Janesville, Wis. 53545
[73] Assignee: Carlin Corporation, Beloit, Wis.
[22] Filed: Jan. 18, 1971
[21] Appl. No.: 107,359

Related U.S. Application Data

[63] Continuation-in-part of Ser. No. 32,218, April 27, 1970, abandoned.

[52] U.S. Cl. ............................................. 73/136 A
[51] Int. Cl. ............................................... G01l 3/04
[58] Field of Search .73/136 A, 136 B, 136 C, 136 D, 73/37

[56] References Cited

UNITED STATES PATENTS

| 839,803 | 1/1907 | Amsler | 73/136 A |
| 2,457,700 | 12/1948 | Martin et al. | 73/136 A |
| 3,273,387 | 9/1966 | Westbrook et al. | 73/136 A |
| 3,342,065 | 9/1967 | Westbrook | 73/136 A |
| 3,069,902 | 12/1962 | Crosby | 73/136 A |
| 2,150,377 | 3/1939 | Keinath | 73/99 X |

FOREIGN PATENTS OR APPLICATIONS

| 1,391,034 | 1/1965 | France | 73/136 A |
| 1,063,829 | 3/1967 | Great Britain | 73/136 A |

Primary Examiner—Charles A. Ruehl
Attorney—Larson, Taylor & Hinds

[57] ABSTRACT

An improved torque sensing unit of simplified construction comprises a torsion shaft provided with a plurality of radial reference members projecting into corresponding radial holes in a tubular sleeve member supported at one end by the torsion shaft in concentric relation thereto. Torsional stress in the shaft is determined, preferably by pneumatic gaging means, by measuring the tangential displacement of the reference members relative to adjacent tangentially adjustable reference surfaces located within the radial holes in the sleeve member. Various novel construction features provide a simple and very rugged unit of compact symmetrical configuration that is highly resistant to error inducing influences. Of particular importance are the novel means employed to isolate connecting joints between different elements of the unit from torsional forces to prevent such forces from producing relative movement between the mating surfaces of those joints.

29 Claims, 14 Drawing Figures

PATENTED JAN 16 1973

INVENTOR.
Armin B. Pagel

INVENTOR.
Armin B. Pagel

TORQUE SENSING INSTRUMENTS

CROSS REFERENCE TO RELATED APPLICATIONS

This application is a continuation-in-part of my U. S. Pat. application Ser. No. 32,218, entitled TORQUE MEASURING INSTRUMENTS, filed on 27 Apr. 1970, now abandoned.

BACKGROUND OF THE INVENTION

1. Field of the Invention

The present invention relates to force sensing instruments and more particularly to instruments for sensing or measuring torque transmitted by a rotating shaft or the like.

2. Description of the Prior Art

Many types of torque sensing instruments have been designed in the past which operate on the principal of sensing or measuring the rotational deflection produced in a predetermined length of a torque transmitting shaft of known torsional characteristics. One convenient and very accurate way of sensing or measuring such deflection is by means of the technique commonly referred to as pneumatic gaging, in which the spacing between the orifice of an air nozzle member and a confronting restrictor surface determines the flow resistance of the nozzle member and therefore can be ascertained as a function of the pressure or flow existing in an air line by which air is directed to the nozzle member from a second flow restriction of known characteristics supplied with air at a constant predetermined pressure. To apply this technique to such instruments, the nozzle member is mounted to the shaft of a torque sensing unit with its orifice directed in tangential relation thereto in close confronting proximity to the flow restricting surface of a restrictor member supported at a different axial location along the shaft. Thus, the torsional deflection of the segment of the shaft between the elements respectively supporting the nozzle and restrictor members manifests itself in the spacing of the air nozzle orifice from the restrictor surface, which is sensed or measured as just described.

A very significant problem inherent in most previously known pneumatic torque sensing units of this general type has been the fact that they have been responsive not only to torsional shaft deflection but also to bending deflection, which is very difficult to avoid in many instances. This problem is substantially eliminated, however, by means of the invention disclosed in U.S. Pat. No. 3,273,387, whereby such a unit is provided with two sets of diametrically opposed nozzle and restrictor members facing in the same circumferential direction in tangential relation to the shaft and in common communication with the air supply line. By employing such a construction, bending distortion of the meter shaft produces self-cancelling opposite variations in the flow restriction of the two nozzles, thereby producing pressure changes in the air line only in response to changes in torsional deflection of the shaft.

While the invention disclosed in the above-identified patent substantially broadens the practicality of pneumatic torque sensing units by minimizing the effect of shaft bending influences, the structures employed in such prior art units to support the nozzle and restrictor members or both are also subjected by centrifugal force to radial bending influences which increase or decrease the spacing of both orifices from the corresponding restrictor surfaces depending on the rotational speed of the unit. Consequently, it has been found necessary to make relatively elaborate corrections computed as a function of the rotational speed of such a unit if accurate torque readings are to be obtained over a substantial range of relatively high rotational speeds.

Another source of inaccuracy which has been found to exist in such units results from relative movement between the nozzle and restrictor members thereof caused by thermal expansion variations between different elements of the meter which are exposed to different temperature influences. For example, the flow of air through the nozzle members generally has a greater cooling effect on the nozzle members than on other elements of the meter, thus causing temperature differences between those parts of the meter which determine the critical spacing between the nozzle orifices and the restrictor surfaces. In prior art sensing units of this type, these temperature restrictions are manifested along relatively long increments of the meter structure which establish the critical spacing of the reference surfaces, thus producing a correspondingly high degree of thermally induced error.

Any torque sensing unit operating of the principal of detecting the torsional deflection of a shaft is subject to some gradual loss of accuracy due to the fact that so-called creep is experienced by the shaft material itself under the influence of sustained torsional stresses. Generally, this factor is relatively insignificant, but, in any case, it can be compensated for either by periodic re-calibration of the instrument or by computing a correction factor based on operating time and predicted stresses. A related source of inaccuracy also has been discovered in prior art instruments of this type, however, which is caused by the fact that different operative elements of the torque sensing unit which are supposedly immovable relative to one another are joined together by joints subjected to torsional distortion. Regardless of how tightly such a joint is clamped or otherwise secured, it is impossible to prevent the occurrence of minute but nevertheless significant slippage at the interfaces of such joined surfaces if one of those surfaces is subjected to torsional distortion. Unlike the aforementioned creep phenomenon, which is relatively constant and predictable, such slippage at the interface of two joint surfaces may occur suddenly only when the stress to which the joint is subjected reaches a critical level. When the torsional stress is relieved, the joint surfaces similarly tend to slip relative to one another in the opposite direction but do not necessarily return precisely to their original relative positions. Furthermore, as such slight relative movement between the joint surfaces polishes or galls those surfaces, the correlation between torsional load and the resulting joint slippage continuously changes. Therefore, even though the relative slippage movement at the joint surfaces be very minute, it can nevertheless eventually produce unpredictable errors of significant magnitude.

SUMMARY OF THE INVENTION

The present invention relates to torque sensing units which are basically similar to those previously described but which eliminate or greatly minimize the aforementioned sources of error while at the same time simplifying machining, assembly, maintenance and calibration of such units. Briefly, these objectives are realized in accordance with the invention by providing a torque sensing unit with a generally tubular sleeve member supported in concentric relation to a torsion shaft by a shaft collar member located at one end of the sleeve. A plurality of radial holes in the end portion of the sleeve opposite the collar member receive symmetrically located nozzle members which project radially outwardly from the torsion shaft to define nozzle orifices facing in the same circumferential direction. The nozzle orifice defined by each nozzle member is located within the corresponding radial hole in the sleeve member in confronting relation to a reference surface of a respective restrictor member adjustably supported within that sleeve hole by the sleeve member. Accordingly, when the shaft is subjected to torsion, the spacing between the nozzle and restrictor members varies in accordance with the twisting experienced by the segment of the shaft between those means by which the nozzle members and the sleeve are supported thereto. As previously explained, the pressure in the air line by which air is delivered to the nozzle orifices from another orifice supplied with air at a constant pressure is therefore indicative of the torque load of the shaft but is not significantly influenced by bending of the shaft. Since centrifugal force acts radially both on the radially disposed nozzle members and also on the tubular sleeve, that force has no influence on the spacing between the nozzle orifices and the corresponding restrictor members except to the inconsequential extent to which the minute radial expansion of the sleeve is capable of producing corresponding transverse elongation of the radial sleeve holes. Because the sleeve member protects the nozzle members from accidental damage, those members may be of relatively small transverse dimensions so that any variation in the spacing of the orifices from corresponding restrictor surfaces resulting from relative thermal expansion or contraction of the nozzle members is correspondingly small. Furthermore, the shrouding of the nozzle members by the sleeve member substantially stabilizes the air flow around the nozzle members and the other elements of the sensing unit so that the unit is not appreciably affected by exposure to drafts of air or similar influences.

The previously explained problem of joint slippage is overcome in a torque sensing unit according to the present invention by reducing the number of components which must be connected in immovable relation to each other and by effecting such connections along portions of the torsion shaft which are substantially isolated from torsional distortion. For example, if the supported end of the tubular sleeve were to be pressed or shrunk onto the periphery of a flange integral with the shaft, at least a minute degree of slippage would inevitably occur due to the fact that the flange itself would be subjected to torsional strain which would produce a slight helical twist to its peripheral surface. In accordance with preferred embodiments of the present invention, however, one face of such a shaft flange is undercut to provide an annular collar integral with the shaft and the flange and projecting axially of the shaft in concentric relation thereto. By visualizing a shaft as comprising a series of infinitely thin disks, each of which rotates slightly relative to the preceding one as the shaft experiences torsional twisting, it will be apparent that the torroidal disks comprising the collar are not subjected to torque and therefore remain in fixed relation to each other. Therefore, in a torque sensing unit constructed in accordance with the invention, either the sleeve and the flange are both made integral with the shaft or the cylindrical bore of the sleeve is engaged with the cylindrical periphery of only the collar portion of the shaft flange so that both of the cooperating joint surfaces are entirely free from torsional influences. The problem of joint slippage is generally less critical in the case of those joints by which the nozzle members are supported to the torsion shaft, but the invention also contemplates isolating those joints from torsional distortion in the same manner by providing a corresponding annular nozzle member support collar integral with the shaft.

Although the invention is disclosed with specific reference to torque measuring instruments employing pneumatic gaging means for measuring the relative movement between reference elements of a torque sensing unit, various features of the invention are equally applicable to torque sensing units employing electronic or other types of transducers for translating such relative movement into an output signal functionally related to the torque to which the sensing unit is subjected.

Various means for practicing the invention and other advantages and novel features thereof will be apparent from the following detailed description of illustrative preferred embodiments of the invention, reference being made to the accompanying drawings in which like reference numerals denote like elements.

DESCRIPTION OF THE ILLUSTRATIVE PREFERRED EMBODIMENTS

The illustrative torque measuring instrument illustrated in FIGS. 1 through 5 of the accompanying drawings comprises a torque sensing unit 21 including a steel shaft member 22 and a tubular steel sleeve member 23. In a typical application, the shaft member is rotatably supported by appropriate bearings and serves to transmit power between input and output power transmission members; for example, between gears mounted to opposite ends of the shaft member. For purposes of clarity, however, such bearings and power transmission members have been omitted from the drawings, in which the opposing torsional forces acting on the power input and output ends of the shaft member are simply illustrated by arrows 24 in FIG. 1. These opposed torsional forces produce a slight twist in the shaft member which is measured along a predetermined central segment of that member to determine the amount of torque being transmitted by the sensing unit.

Figure 1:
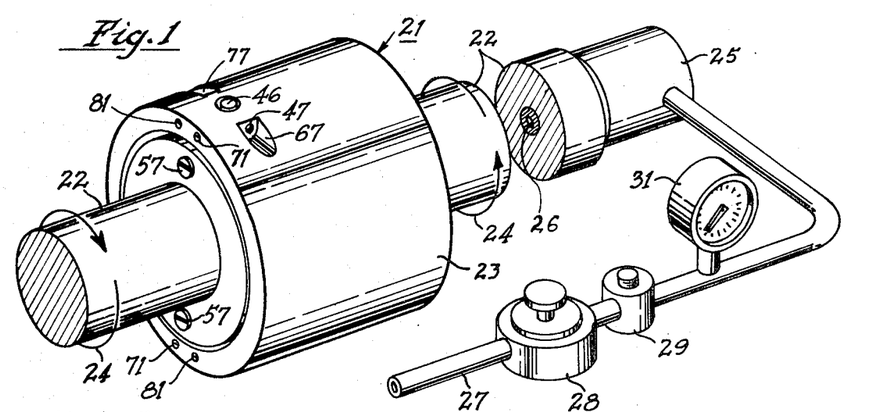
FIG. 1 is a perspective view of a pneumatic torque measuring instrument according to a preferred embodiment of the present invention.

At one end, the shaft member is provided with a rotary seal or gland 25 which is adapted to establish an airtight connection between a central passageway 26 in the rotating shaft member and an air line 27 connected to a source of compressed air, not shown. Between the source of compressed air and the rotary seal, the air line includes an adjustable pressure regulator 28 adapted to provide air under constant pressure to an adjustable flow restrictor valve 29; both of such units remaining at previously established settings during the operation of the torque measuring instrument. The air pressure indicated by a pressure gauge 31 between restrictor valve 29 and rotary seal 25 is therefore functionally related to the rate at which air escapes from passageway 26 through the torque sensing unit, which is determined by the torque experienced by that unit as described in detail below. Accordingly, gauge 31 can be calibrated in torsional units, such as foot pounds or inch pounds to thereby provide a direct reading of the torque being transmitted by the shaft member.

Figure 2:
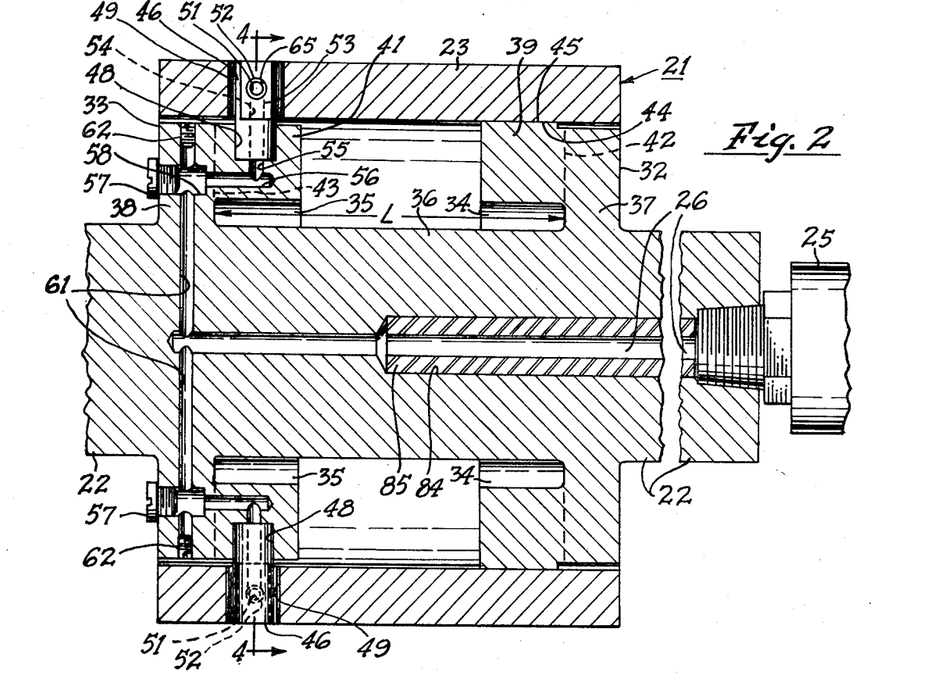
FIG. 2 is a cross sectioned side elevational view of the torque sensing unit of the instrument shown in FIG. 1.
Figure 3:
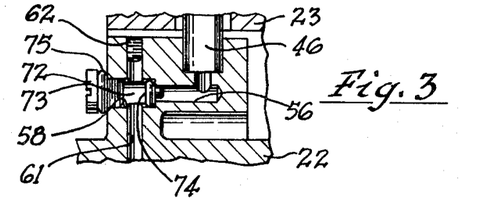
FIG. 3 corresponds to a portion of FIG. 2 and shows a valve screw installed in the torque sensing unit to block the passage of air to one of the nozzle members thereof.

By reference to FIG. 2 of the drawings, it will be seen that shaft member 22 includes two integral flanges 32 and 33 which are partially undercut by respective opposed circular recesses 34 and 35 which defined the length L of the central segment 36 of the shaft member. Thus, the two flanges 32 and 33 can be considered as comprising respective radial flange segments 37 and 38 which are joined integrally with annular collars 39 and 41 along corresponding imaginary radial planes represented by broken lines 42 and 43.

As previously mentioned, the torsional forces represented by arrows 24 cause the shaft member to twist slightly in proportion to the total torque which it is transmitting. Since all of the external shaft member surfaces are concentric with the shaft axis, this twisting distortion of the shaft member can be visualized by considering that member as comprising an infinite series of disk increments, each of which rotates slightly relative to the preceding one. Because the torsional deflection of a substantially solid shaft of circular cross section varies inversely in proportion to the fourth power of the shaft diameter, this twisting distortion will be greater per unit of axial length along the central and end segments of the shaft member than along the two radial flange segments 37 and 38. By referring again to the analogy of the shaft member to a series of incremental disks, it will be apparent, however, that the annular collars 39 and 41 are totally free from torsional influences beyond the imaginary radial planes 42 and 43 at the ends of the corresponding undercut recesses 34 and 35. Consequently, the angle of relative rotational displacement between the two annular collars is equal to the twist angle experienced by the central segment of the shaft member extending between the end surfaces of the opposed undercut recesses. The relative rotation that can be expected to occur between the two annular collars under the influence of different torsional moments can therefore be calculated quite closely as a combined function of the polar moment of inertia, the modulus of elasticity and the length L of the central segment of the shaft member.

Sleeve member 23 is supported in concentric relation to shaft member 22 by an interference fit between the internal sleeve bore 44 and the peripheral cylindrical surface 45 of annular collar 39. As explained above, collar 39 is isolated from torsional distortion of the shaft member. Therefore, its peripheral cylindrical surface 45, which is slightly shorter than the axial depth of undercut recess 35, is likewise completely free of such distortion influences. This construction therefore entirely eliminates the previously described creep phenomenon at the joint between the sleeve member and the shaft member; thus allowing the sleeve member to be considered as if it were an integral part of the shaft flange 32.

The opposite unsupported end of sleeve member 23 surrounds shaft member flange 33 and is of larger internal diameter than the outer diameter of that flange so that no physical contact occurs between the sleeve and shaft members except at the joint provided by surfaces 44 and 45. It will be apparent, therefore, that the application of opposing torsional forces to the shaft member causes the unsupported end of the sleeve member to rotate relative to annular collar 41 through the same rotational angle as that through which the central segment of the shaft member is twisted. Consequently, the amount of torque transmitted by the shaft member can be determined by measuring the relative rotational movement between the sleeve member and shaft collar 41; which is accomplished by means of two sets of reference members each of which comprises a radial air nozzle member 46 and a tangential restrictor member 47.

The two nozzle members are supported coaxially in diametrically opposed radial relation to the shaft member by being threaded or tightly pressed into mating holes 48 in annular collar 41 and project into corresponding larger radial holes 49 in sleeve member 23. As explained in connection with the support sleeve member 23, the isolation of annular collar 41 from torsional influences prevents any relative movement from occurring between the mating surfaces of the nozzle members and their respective mating holes 48 as a result of torsional distortion of the shaft member; thereby precluding rotational movement of the nozzle members from occurring due to the same type of creep phenomenon discussed earlier. It should be noted, however, that the effect of this phenomenon with respect to the nozzle members is relatively insignificant and can be ignored except in the case of instruments intended for very critical applications.

Each of the nozzle members is provided with a lateral orifice 51 defined by a short orifice collar 52 projecting beyond a flat external surface 53. Instead of being integral with the nozzle members, as shown, the orifice collars can comprise short sleeves made of an appropriate hard material and pressed into mating holes in those members. The orifice of each nozzle member intersects a central nozzle member hole 54 which in turn communicates through an intermediate hole 55 with a longitudinal hole 56 closed by a screw plug 57 threaded into the enlarged portion 58 of that hole adjacent the outer face of flange 33. A transverse hole 61, plugged at both ends by threaded plugs 62, connects the enlarged bore portions of both axial holes 56 with the central shaft passageway 26. Thus, air introduced into the latter passageway through rotary seal 25 is conducted to both nozzle orifices through the various holes just described.

Figure 4:
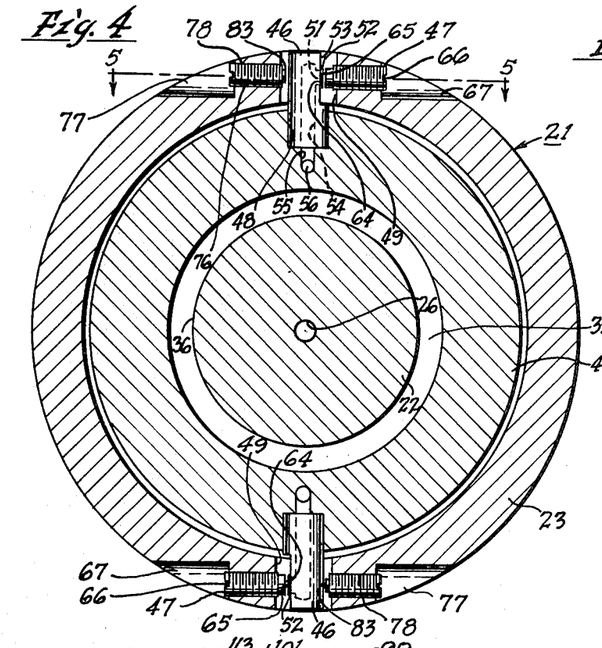
FIG. 4 is a cross sectioned end elevational view of the torque sensing unit shown in FIGS. 1-5 taken along line 4—4 of FIG. 2.
Figure 5:
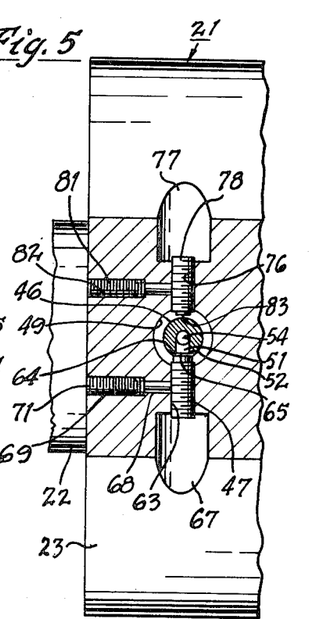
FIG. 5 is a fragmentary plan view of the torque sensing unit depicted in FIGS. 1-5 cross sectioned along line 5—5 of FIG. 4.

As best illustrated in FIG. 4, the two nozzle orifices are at the same distance from the axis of the shaft member and face in the same circumferential direction in tangential relation to the sensing unit. The two restrictor members 47 are of threaded cylindrical form and are supported tangentially of the shaft member in coaxial alignment with the orifices of the corresponding nozzle members by mating threaded holes 63 in sleeve member 23. The flat end faces 64 of the restrictor members are accurately machined at right angles to the axes thereof and extend into the corresponding radial sleeve holes 49 in parallel confronting relation to faces 65 of the respective orifice collars. The opposite ends of the restrictor members are provided with screwdriver slots 66 which are accessible within sleeve recesses 67; thereby allowing the flow restriction characteristics of each nozzle member to be adjusted by increasing or decreasing the small gap between the corresponding reference member face surfaces 64 and 65. After such adjustment has been made, each restrictor member can be locked securely in place by means of a clamping arrangement, shown in FIG. 5, comprising a soft metal or plastic locking plug 68 which is slidably received in a partially threaded longitudinal hole 69 in the sleeve member and adapted to be forced into engagement with the restrictor member by means of a threaded locking screw 71.

The adjustment of the reference members is performed while the sensing unit is free from torsional influences to provide a predetermined air pressure in air line 27. Because the functional relationship between variations in the spacing of the reference surfaces and the resulting changes in the measured air pressure may not be entirely linear, both sets of reference members should be adjusted to have the same flow restricting characteristics to insure that bending influences will not produce erroneous readings on gauge 31. To facilitate such adjustments, the supply of air to either nozzle member can be shut off by removing the corresponding screw plug 57 and substituting a valve screw 72, shown in FIG. 3. The valve screw includes a stem 73 provided with an O-ring 74 which plugs the passage of air through hole 56 by seating against the shoulder at the end of the enlarged portion thereof. A second O-ring 75 serves as a compressible washer between the screw head and the face surface of flange 33 to prevent air from leaking past the screw threads. With the air passageway to one of the nozzle members thus blocked and with the sensing unit free of torsional forces, the restrictor member associated with the other nozzle member is adjusted to provide a predetermined calibrated reading on gauge 31; whereupon the same process is repeated to adjust the other reference member to provide the same gauge reading. Similarly, to determine whether any leaks exist elsewhere, two such valve screws can be employed simultaneously to prevent any air from escaping through the nozzle members.

After the foregoing adjustments of the reference members have been accomplished and screw plugs 57 have been replaced, a torsional load applied to the shaft in the direction shown by arrows 24 simultaneously reduces the gap between both pairs of confronting reference surfaces, thereby increasing the air pressure indicated on gauge 31. If the shaft member experiences bending distortion, however, one pair of reference surfaces moves apart as the other pair of such surfaces simultaneously moves together; whereby the combined flow capacity of the two orifices remains unchanged. Therefore, gauge 31 responds only to changes in torque transmitted by the shaft member and can be calibrated accordingly by subjecting the sensing unit to known torsional loads.

To obtain maximum measured accuracy, the reference surfaces of the nozzle and restrictor members must be quite close together and must move relative to each other through a correspondingly small distance. For example, in a typical torque sensing unit the confronting reference surfaces might be spaced from each other by about 0.002 inch when the unit is free from torsional forces and by about 0.001 inch when the unit is subjected to the maximum torque which it is intended to measure. Thus, the unit could be subjected to approximately twice its maximum rated torque load before the reference surfaces would come into contact with each other. If the unit is properly proportioned to its intended application, such occasional accidental overloading will not stress the shaft member to its elastic limit and therefore will not seriously effect the accuracy of the instrument. However, if the sensing unit were to be subjected to a torsional overload sufficient to drive the reference surfaces together, which can be verified by visual observation of those surfaces, the accuracy of the instrument would almost certainly be destroyed, particularly if the torsional forces involved were sufficient to produce irreversible twisting of the shaft member.

Obviously, the same sensing unit disclosed in FIGS. 1 through 5 can be adapted to measure torsional forces applied thereto in opposite directions to arrows 24 either by reversing the nozzle members and the restrictor members so that they face in the opposite directions or by initially adjusting the restrictor members to provide the minimum reference surface spacing and by calibrating the gauge to indicate increasing torque loads as a function of decreasing measured air pressure. In many applications, however, the sensing unit is more likely to be overloaded in a reverse direction than in the direction of the torsional forces that it is intended to transmit. By way of illustration, if the unit were incorporated between a motor driven worm gear speed reduction unit and a heavy rotating member, the motor normally would be incapable of producing sufficient torque to substantially overload the sensing unit. However, if the motor should suddenly stop, the sudden reverse torque imparted to the sensing unit by the rotational inertia of the rotating member can easily be much greater than the maximum rated torque capacity due to the fact that the speed reducing transmission cannot be driven from its power output shaft. For this reason, the reference surfaces preferably are adapted to move together under increasing torque loads, rather than apart, because in the latter case a reverse torque load can bring the reference surfaces into damaging contact with each other even though that load does not significantly exceed the rated capacity of the sensing unit.

In coaxial alignment with each threaded hole 63, but at the opposite side of the corresponding radial sleeve hole 49, the sleeve member is provided with another identically threaded hole 76 which terminates in a recess 77 corresponding to the opposite recesses 67. An overload indicator member 78 is threaded into each hole 76 and can be locked in the same manner described above by a locking plug 79 which is pressed against the indicator member threads by a locking screw 81 threaded into longitudinal hole 82. Overload indicator members 78 are preferably made of relatively soft metal and are adjusted so that their end faces 83 will be engaged and deformed by the adjacent cylindrical surface of the corresponding nozzle member if the sensing unit is subjected to a predetermined reverse torque overload; thus providing means for visually ascertaining whether such overloading has occurred. Since holes 63 and 76 are identically threaded and symmetrically located with respect to radial sleeve holes 49, this arrangement also allows the sensing unit to be assembled to operate in either direction simply by installing the nozzle members, the restrictor members and overload indicator members accordingly.

For practical purposes, it is very difficult to calculate the dimensions of a particular sensing unit with sufficient accuracy to provide precise predetermined correlation between transmitted torque and the spacing of the reference surfaces of that unit; but a slight difference between the actual torsional stiffness and the calculated torsional stiffness of the sensing unit shaft member is inconsequential if the gauge dial is calibrated to match that particular unit. It is preferable, however, to make the torsional stiffness of the shaft member initially somewhat too great, so that it can be reduced slightly after the sensing unit is assembled; thereby allowing the unit to be "tuned" to match a pre-calibrated gauge in order that interchangeable gauges can be employed with all units of the same rated capacity. Once sleeve member 23 has been installed, it is no longer possible to reduce the torsional stiffness of shaft member 22 by lengthening or reducing the diameter of its operative central segment 36. Accordingly, the tuning operation is performed by measuring the response of the sensing unit under its maximum rated load and then by progressively drilling or otherwise enlarging central passageway 26, as shown at numeral 84, until the torsional stiffness of the shaft member precisely matches the calibration of the gauge dial. Because the increased volumetric capacity of passageway 26 would otherwise retard the speed with which the gauge responds to torsional changes, a plastic tube 85 or the equivalent is loosely inserted into the enlarged passageway bore to restore the passageway to its original volume.

By reference to FIG. 4, it will be apparent that centrifugal forces acting on the rotating sensing unit do not produce any bending influences on the nozzle members or on the symmetrical tubular sleeve member. Therefore, such forces do not alter the critical spacing of the reference surfaces except to the inconsequential extent to which the resulting symmetrical radial expansion of the sleeve is capable of producing transverse elongation of the radial sleeve holes. Also, if the temperature of the nozzle members should be slightly different from that of the sleeve members because of the heating or cooling influences of the pressurized air, the corresponding differences in thermal expansion of those members have substantially no detectable effect on the spacing of the reference surfaces because of the close proximity of those surfaces to the respective central axes of the nozzle members. In this regard, it should also be observed that the transverse dimensions of the nozzle members need not be increased in proportion to the outer diameter of the sensing unit. In other words, regardless of the size of the sensing unit, the distance from the reference surfaces to the center lines of the corresponding nozzle members need not be greater than a quarter of an inch and generally will be considerably less than that amount.

Still another important feature common to all of the illustrative embodiments of the invention is the fact that the peripheral surfaces of the sensing units are devoid of protrusions or sharp surfaces which might cause serious injury if someone were to come into contact with such a unit while it is rotating. Furthermore, the nozzle members and reference members are effectively shrouded by the sleeve member and are thus precluded from being accidentally damaged.

Figure 6:
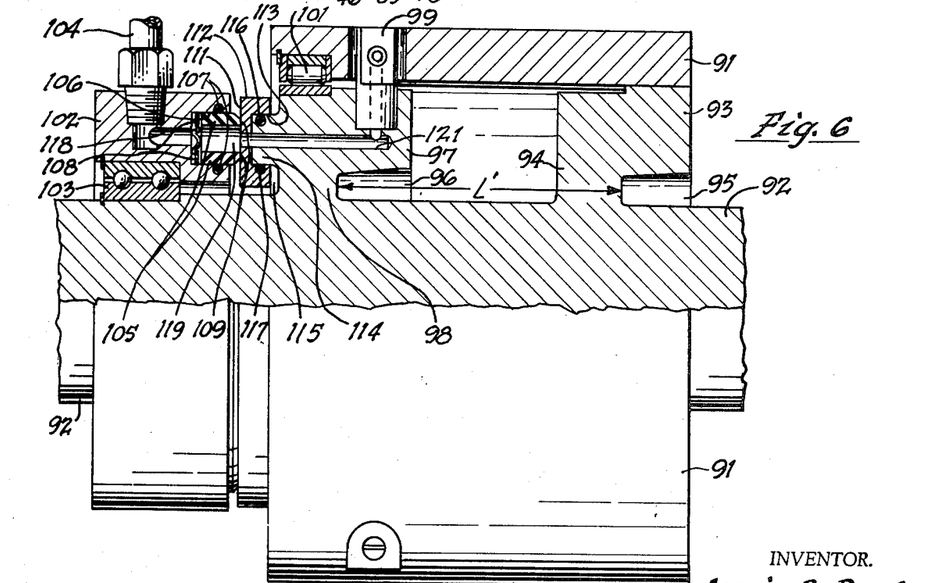
FIG. 6 is a partially cross sectioned side elevational view of an alternate embodiment of the invention comprising a pneumatic torque sensing unit including a rotary air seal surrounding the shaft member thereof.

The embodiment of the invention illustrated in FIG. 6 operates in the same general manner described above. In this embodiment, however, sleeve member 91 is supported to shaft member 92 by collar 93 of shaft flange 94, which is undercut from its outer face by recess 95. Consequently, the effective length L' of shaft member 92 is measured between the end of recess 95 and the end of recess 96 which defines the nozzle member support collar 97 of shaft flange 98. Since recess 95 is accessible after the sleeve member has been installed, this construction allows the sensing unit to be tuned by increasing the length of that recess while the shaft member is subjected to a known torsional load. Beyond the nozzle members 99, the sleeve member is maintained in concentric relation to the shaft member by a substantially frictionless precision roller bearing assembly 101, the rollers and races of which are preferably made of a very hard material such as tungsten carbide. This bearing, therefore, does not significantly retard the relative circumferential movement between the nozzle members and the corresponding reference members carried by sleeve 91, which correspond to those previously described. However, by positively preventing relative radial movement between the shaft member and the end of the sleeve member adjacent the nozzle members, bearing 101 provides additional immunity to errors attributable to bending forces exerted on the sensing unit and also reduces the possibility of the sleeve member vibrating relative to the shaft member at high rotational speeds.

If air is supplied to the nozzle members through a central shaft passageway, as previously described, the rotary air seal unit must be mounted to an accessible end of the sensing unit shaft member or of another centrally drilled shaft comprising an extension thereof. In many cases, however, this requirement dictates the inconvenient and expensive operation of rifle drilling one or more very long air passageway holes. To eliminate this problem, the sensing unit shown in FIG. 6 includes a rotary air seal comprising a ring member 102 which is supported in concentric relation to the shaft member adjacent flange 98 by a ball bearing assembly 103. The ring member, in turn, is connected to an air supply line 104, corresponding to air line 27, which maintains the ring member stationary while the sensing unit rotates. Two concentric sealing rings 105, made of graphite or other appropriate self-lubricating material, are received in an annular slot 106 in ring member 102 in slidable airtight engagement with O-ring sealing elements 107. Wave springs 108 urge the sealing rings toward the adjacent shaft flange 98 to maintain the flat end faces 109 of those rings in light but positive contact with the flat surface 111 of annular sealing member 112. The sealing member is provided with a concentric internal recess 113 which receives a mating annular collar 114 of flange 98 to support that member with its face surface precisely in right angle relation to the shaft member axis. Annular collar 114 is undercut by a recess 115 and is therefore isolated from torsional distortion influences in the same manner previously described, thus insuring that such influences cannot produce any distortion of the flat surface 111 of the annular sealing member supported by collar 114. Two concentric O-rings 116 and 117 provide airtight engagement between the internal sealing member recess 113 and flange collar 114 and frictionally retain those two elements in non-rotatable relation to each other. As the shaft member rotates, air is admitted through passageway 118 to chamber 119 between the two sealing rings and is delivered from that chamber to the two nozzle members through corresponding longitudinal holes 121 extending through sealing member 112 and into flange 98. The face surface contacted by the sealing rings obviously could be provided directly on collar 114 but the use of a separate annular sealing member allows that member to be made of a harder material than would be appropriate for the shaft member and also simplifies the production and maintenance of the perfectly flat face surface. Alternatively, it would also be possible to support the two sealing rings by means of flange collar 114 and to provide the corresponding flat face surface as a part of the stationary ring member.

Figure 7:
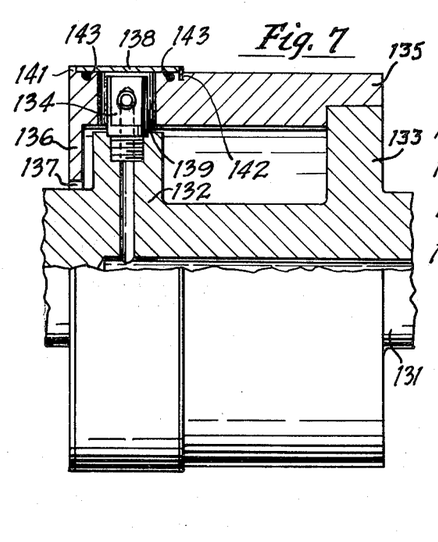
FIG. 7 is a partially cross sectioned side elevational view of a pneumatic torque sensing unit according to another alternate embodiment of the invention.

FIG. 7 shows another embodiment of the invention comprising a relatively inexpensive torque sensing unit generally analogous to those described above but in which shaft member 131 is provided with two parallel radial flanges 132 and 133 which respectively support nozzle members 134 and sleeve member 135. In this sensing unit, the interfaces between the shaft member and the sleeve and nozzle members are not isolated from torsional distortion. However, if the flanges are substantially larger than the rest of the shaft member and if the latter is subjected only to relatively low torque, such a unit will nevertheless be satisfactory for applications which do not require extremely accurate torque monitoring and in which freedom from drift over a long period of operation is not of paramount importance. As shown at numeral 136, the sleeve member includes an integral annular end collar spaced from flange 132 and provided with a central opening 137 concentric with but larger than the portion of the shaft member which extends therethrough. A tubular collar 138 encircles sleeve member 135 in alignment with the radial sleeve holes 139 which accommodate the nozzle members and is maintained in place by sleeve member lip 141 and by a removable snap ring 142. At opposite sides of the radial sleeve holes, a pair of O-rings 143 provide airtight engagement between the sleeve member and tubular collar 138. Accordingly, air delivered through the nozzle members exhausts from the sensing unit through the central opening 137 of annular end collar 136, thereby allowing the unit to be employed in a highly corrosive atmosphere by insuring that the critical reference surfaces are exposed only to clean air supplied to the nozzle members.

Whenever the sensing unit is rotating at high speed, centrifugal force acting on the air in the radial passageways leading to the nozzle members produces a minute increase in the air pressure at the nozzle orifices. This pressure variation is too small to be of any consequence in most cases, but if extreme accuracy is required of a relatively large diameter sensing unit operating through a substantial range of very high rotational speeds, a similar annular collar member can be provided in conjunction with a modified rotary seal corresponding generally to the one shown in FIG. 6 in order that air will enter and exhaust from the sensing unit at the same distance from its axis of rotation; thereby cancelling out the effect of centrifugal force on the pressure drop that occurs at the nozzle orifices.

Figure 8:
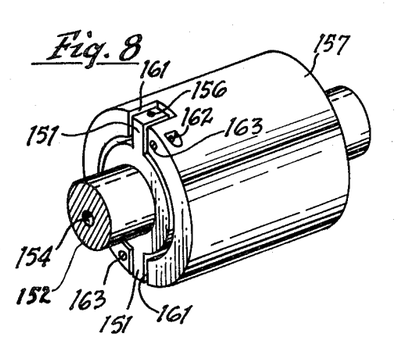
FIG. 8 is a perspective view of an additional alternate embodiment of the invention comprising a pneumatic torque sensing unit including nozzle members which are integral with the shaft member thereof.
Figure 9:
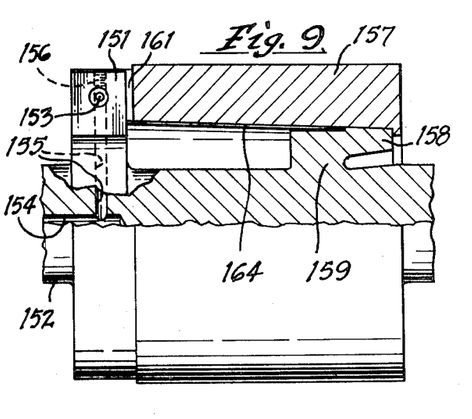
FIG. 9 is a partially cross sectioned side elevational view of the torque sensing unit shown in FIG. 8.

The sensing unit illustrated in FIGS. 8 and 9 likewise operates in the same general manner described above, but in this unit the opposed nozzle members 151 are machined integrally with shaft member 152 to provide oppositely facing orifices 153 connected to the central shaft passageway 154 by a transverse hole 155 plugged at both ends by plug screws 156. The sleeve member 157 is pressed or shrunk onto the undercut collar 158 of shaft flange 159 by being slid over that collar from the corresponding end of the shaft member and is provided with rectangular radial notches 161 which receive nozzle members 151. As shown at 162 in FIG. 8, a reference member is adjustably supported in alignment with each nozzle orifice in the same manner previously described and can be locked in place by a locking screw 163. This construction therefore simplifies the production of the sensing unit by eliminating the extra operations involved in machining the nozzle members separately and then installing them and also avoids all possibility of an unpredictable movement of the nozzle members relative to the shaft member. It will also be observed that the internal bore 164 of sleeve member 157 is tapered outwardly toward the nozzle members to facilitate assembly of the unit and insure that any moisture or the like that may accumulate within that member will be discharged through openings 161 by centrifugal force.

Figure 10:
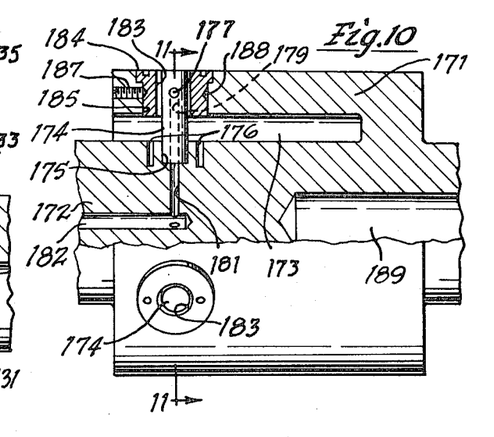
FIG. 10 is a partially cross sectioned side elevational view of another embodiment of the invention comprising a pneumatic torque sensing unit employing three pairs of equiangularly disposed reference members and including a sleeve member integral with the shaft member.
Figure 11:
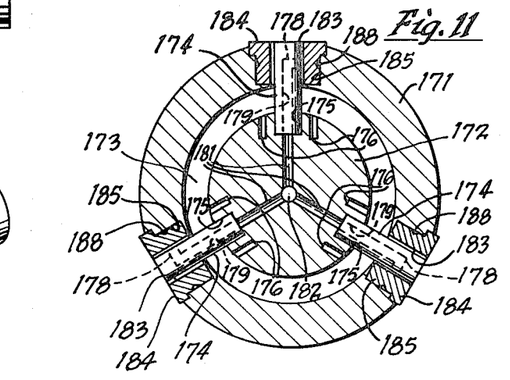
FIG. 11 is a cross sectioned end elevational view taken along line 11—11 of FIG. 10.
Figure 12:
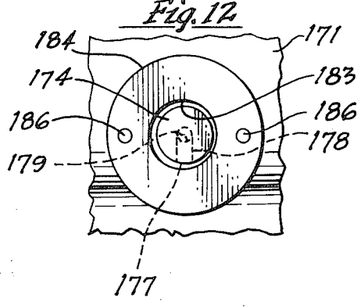
FIG. 12 is an enlarged view taken radially of the torque sensing unit illustrated in FIGS. 10 and 11 illustrating one of the three pairs of reference members thereof.

In accordance with the embodiment of the invention depicted in FIGS. 10, 11 and 12, the sleeve 171 and the shaft member 172 of the sensing unit illustrated in those Figures are machined integrally with each other from a single piece of metal by employing a trepanning operation to produce an elongate annular bore 173 which defines the internal surface of the sleeve and the external surface of the corresponding portion of the shaft member. Accordingly, by eliminating any joint between the sleeve and the torsionally deflected shaft, this construction completely avoids the occurrence of unpredictable relative movement between those elements.

Another very important aspect of the present invention illustrated by the sensing unit shown in FIGS. 10 through 12 is the discovery that the effective cancellation of errors caused by shaft bending influences does not necessarily require the use of two sets of reference members located diametrically opposite each other but can also be accomplished by three or more sets of reference members if the latter are located relative to each other such that the cumulative closing of the orifices at one side of any longitudinal bending plane lying along the shaft axis produces a counteracting cumulative opening of the orifices located at the opposite side of that place; thereby preventing any significant change from occurring in the measured air pressure as the result of such bending. For example, it can be demonstrated both mathematically and experimentally that this objective will be achieved if any plurality of sets of reference members of the type previously described are provided in uniformly spaced circumferential relation to each other. Since the torque measuring sensitivity of the sensing unit is proportional to the cumulative area of the nozzle orifices, this discovery allows the sensitivity to be increased by employing more than two nozzle members rather than by simply using larger orifices, which necessarily requires larger nozzle members and therefore decreases the immunity of the sensing unit to thermal influences. Also, the use of more than two sets of nozzle members improves the symmetry of the sensing unit and makes it less subject to vibration at high speeds. Preferably, an odd number of uniformly spaced nozzle members are provided in order that the radial shaft member holes by which air is conducted to the nozzles do not continue completely through the shaft member; thus improving the symmetry of the shaft with respect to its resistance to lateral bending and also providing more uniform distribution of internal shaft stresses.

In accordance with the discovery explained above, the sensing unit depicted in FIGS. 10 through 12 is provided with three nozzle members 174 located along respective imaginary center lines extending radially at 120° intervals from a common point along the center axis of the sensing unit. Since the nozzle members are supported in mating holes 175 in the shaft member, the twisting distortion of the latter will inherently cause some distortion at the nozzle member joint surfaces which may produce minute rotational movement of the nozzle members. As previously explained, this possible source of error can simply be ignored for many applications. If desired, however, annular grooves 176 can be trepanned in the shaft member around the corresponding nozzle member support holes to reduce the distortional force to which those holes are subjected as a result of twisting of the shaft member. Alternatively, this possible source of error obviously can be avoided by supporting the three nozzle members by means of an undercut flange collar as previously described.

In this embodiment of the invention, each nozzle member is substantially cylindrical throughout its entire length and includes a lateral orifice 177 defined by the intersection of transverse nozzle hole 178 with the surrounding external cylindrical surface of the nozzle member. Central nozzle member holes 179 intersect the respective transverse nozzle holes and are aligned with corresponding radial shaft holes 181 to which air is supplied from the central shaft passageway 182.

Each of the three nozzle members 174 extends into the cylindrical central hole 183 of a corresponding restrictor member 184 provided with a stepped cylindrical outer surface received in a correspondingly stepped radial cylindrical hole 185 in sleeve member 171. Sleeve member holes 185 are concentric with the axes of the corresponding nozzle members but the central restrictor member holes 183 are located slightly off center as shown in FIG. 12. Accordingly, the spacing between each nozzle member orifice and the confronting internal hole surface of the corresponding restrictor member can be adjusted very accurately by rotating the latter member with an appropriate miniature spanner wrench adapted to engage spanner holes 186. After each restrictor member is properly adjusted, it can be locked in place by a locking screw 187, shown in FIG. 10, which is provided with a conical tip received in a peripheral groove 188 encircling the restrictor member. It should be obvious that reference members of the type described earlier are equally applicable to the sensing unit shown in FIGS. 10 and 11 and that reference member corresponding to those just described can likewise be employed in alternate sensing unit embodiments.

Once the nozzle members have been installed, it is no longer possible to increase the length of annular bore 173 for purposes of tuning the sensing unit, which is therefore accomplished by means of enlarged axial hole 189. In contrast to the corresponding enlarged axial hole 84, shown in FIG. 1, however, hole 189 is shown drilled into the sensing unit from the end thereof opposite the central air passageway and therefore has no influence on the size of that passageway.

Figure 13:
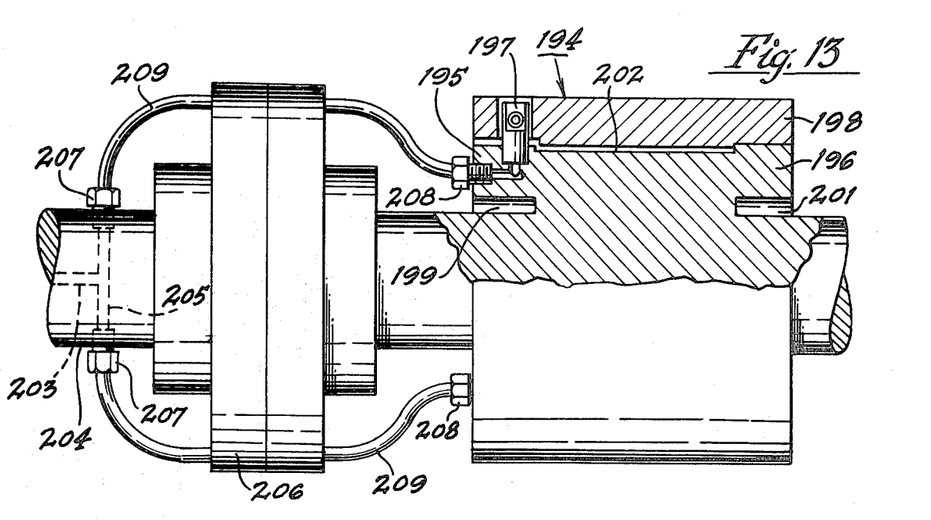
FIG. 13 is a partially cross sectioned side elevational view of a different alternate embodiment of a pneumatic torque sensing unit according to the invention.

The torque sensing unit 194 comprising the embodiment of the invention shown in FIG. 13 functions in the same manner described in connection with FIGS. 1 through 4. In this embodiment, however, the annular collars 195 and 196 which respectively support the nozzle members 197 and the sleeve member 198 are undercut by corresponding annular recesses 199 and 201, both of which face inwardly. The central reference segment 202 of the shaft member is therefore defined between the confronting ends of those recesses. Because the torsional deflection of a shaft varies in proportion to the fourth power of the torsional load whereas the shaft stress varies in proportion to the third power of the torsional load, proper proportioning of a particular sensing unit sometimes requires the reference segment of the shaft member to be of substantially greater diameter than the end segments thereof. This embodiment of the invention greatly facilitates the production of such a sensing unit by allowing the central reference segment of the shaft member to be almost as large as the internal diameter of the sleeve member; thereby minimizing the overall diameter and weight of the unit and substantially reducing the amount of metal that must be removed in the process of machining the shaft member.

In many applications, it is necessary to couple the torque sensing unit to an extension shaft provided with a central air passageway. If the sensing unit is also provided with a central air passageway, an air tight connection is established between the two passageways by an appropriate sealing device located within the coupling. In the embodiment of the invention shown in FIG. 13, however, the central passageway 203 in extension shaft 204 terminates at a cross hole 205 beyond the rigid or flexible coupling 206 by which the extension shaft is connected to sensing unit 194. The opposite ends of the cross hole are provided with tube fittings 207 and similar fittings 208 are threaded into collar 195 in communication with the corresponding nozzle members. Air tubes 209 pass through corresponding holes in coupling 206 between fittings 207 and the corresponding fittings 208 to thereby conduct air to both nozzle members. This arrangement therefore simplifies the construction and installation of the sensing unit and also facilitates the previously described calibration procedure by allowing the air supply to either nozzle member to be terminated, either by disconnecting and blocking the sensing unit end of the appropriate air tube or by employing flexible air tubes that can be blocked by being squeezed with a clamping device.

Figure 14:
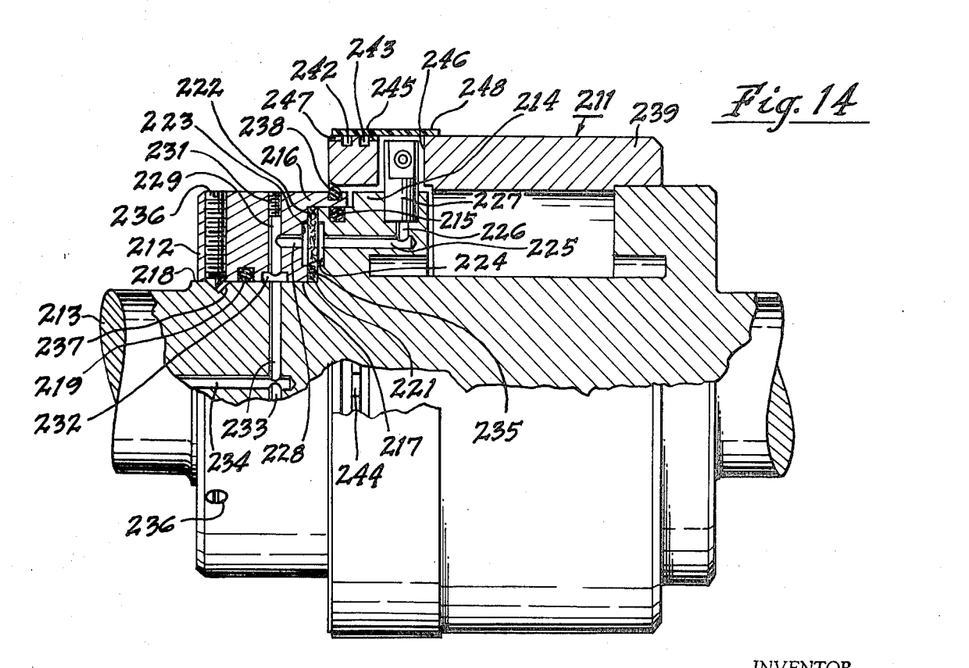
FIG. 14 is a partially cross sectioned side elevational view of yet another alternate embodiment of the invention comprising a pneumatic torque sensing unit provided with a removable air distributing collar and with an internal air filter.

The torque sensing unit 211 depicted in FIG. 14 is basically similar to the device illustrated in FIGS. 1 through 4 but includes a removable air distributing collar 212 surrounding the end shaft segment 213 adjacent nozzle support flange 214. The periphery of the latter flange is reduced in diameter adjacent collar 212 and is provided with an O-ring seal 215 that engages the inner surface of annular collar lip 216. The cylindrical central bore 217 of collar 212 is supported by the mating cylindrical surface 218 of shaft segment 213 and is likewise provided with a O-ring seal 219 engaged with that surface. The flat end faces 221 and 222 of collar 212 and shaft flange 214 include respective opposed annular grooves 223 and 224. An axial air hole 225 in flange 214 connects the radial air hole 226 below each nozzle member 227 with annular groove 224. Similarly, collar 212 is provided with two oppositely located axial air holes 228 connecting annular groove 223 with corresponding transverse holes 229 which are plugged at their outer ends by screws 231. Holes 229, in turn, are open to a circumferential groove 232 in the bore of collar 212, which is aligned with shaft cross hole 233 intersecting the central shaft air inlet passage 234.

A ring shaped permeable filter disk 235 is located between the respective faces 221 and 222 of collar 212 and flange 214. The collar is secured to the shaft by three radially disposed cone point set screws 236 spaced from each other at 120° angular intervals. A peripheral V-shaped groove 237 in the shaft member has the same angle as that of the conical tips of set screws 236. This groove, however, is offset slightly from the set screws in the direction of flange 214 so that tightening the set screws urges the collar toward that flange and thereby squeezes the edges of the filter disk between faces 221 and 222. Accordingly, air introduced into the central air passageway 234 passes through the filter disk before reaching the nozzle members so that any foreign particles in the air will be trapped before reaching the critical gaging surfaces. Because of the relatively large effective surface area of the filter disk defined by annular grooves 223 and 224, it will be apparent that a considerable number of foreign particles can be trapped by the filter before its air conducting capacity decreases sufficiently to affect the accuracy of the sensing unit. It should also be noted that this filter is not intended to replace the conventional filter that would normally be installed in the air supply line in advance of the pressure regulation; but rather to provide a second stage of filtration capable of removing foreign material that may have been introduced into the system beyond the conventional filter during installation or servicing operations.

To protect the critical gaging elements from hostile environmental conditions, sensing unit 211 includes an O-ring 238 carried by annular collar lip 216 in sealing engagement with the adjacent internal bore of the sensing unit sleeve member 239. The torque sensing accuracy of the sensing unit is slightly influenced by O-ring 238 to the extent that the resiliency of the ring resists circumferential movement of the sleeve member relative to the sensing unit shaft, but this consideration is completely inconsequential for most applications. The outer periphery of the sleeve member 239 includes two circumferential grooves 242 and 243 which are joined by connecting slots 244 at opposite sides of the sleeve member in ninety relation to the nozzle members. Another pair of slots 245 connect groove 243 with the radial nozzle receiving holes 246 in alignment with similar slots 247 extending from groove 242 to the adjacent end face of the sleeve member. A circumferential band 248 surrounds the two grooves 242 and 243 and the radial nozzle receiving holes 246. Preferably, band 248 simply comprises one or more layers of adhesive plastic tape, which can be conveniently removed and replaced without disturbing the couplings or bearings by which the sensing unit is supported. With this sealing arrangement, air discharged from the nozzle members enters groove 243 through slots 245, passes into groove 242 through slots 244, and is then discharged to the atmosphere through slots 247. Because of the circuitous route established by the interconnected slots and grooves, it is very unlikely that water or other foreign substances will reach the critical gaging elements, even when the sensing unit is not being supplied with pressurized air. Furthermore, the location of these grooves and slots at the outer periphery of the sleeve member insures that any moisture within the sensing unit will tend to be discharged by centrifugal force.

Although the illustrative torque sensing units have been described in conjunction with a gaging system that measures the pressure loss occurring at the nozzle member orifices, it should be understood that the present invention is directed particularly to the disclosed torque sensing units, as such, which are equally suitable for use in conjunction with other types of pneumatic gaging systems adapted to measure the spacing between the nozzle members and the corresponding restrictor members. For example, as is also well known in the pneumatic gaging art, the spacing of the nozzle and restrictor members could be monitored by a generally similar gaging system adapted to measure the volumetric rate at which air supplied at a predetermined pressure is exhausted through the nozzle member orifices. Similarly, flow regulating devices can be utilized to improve the linearity of the illustrative gaging system by maintaining a constant pressure drop through the restrictor valve or an equivalent orifice. Various other forms of fluidic amplifier devices or the like obviously can also be incorporated in the gaging system, which is not limited simply to providing a visible indication of transmitted torque but which can also serve to regulate various automatic control systems. Furthermore, many features of the disclosed torque sensing units could be incorporated advantageously in similar units in which relative movement between analogous reference members is measured by other types of transducer means, e.g. electronic transducers, optical devices, etc. For special applications, it would also be possible to modify any of the illustrative sensing units to transmit torque through its tubular sleeve member rather than through its central shaft member, in which case the sleeve support means could employ the same basic principles previously described to prevent torsional distortion of the sleeve member from producing the aforementioned creep phenomenon at the joint between that member and the shaft member. Also, it should be recognized that the illustrative sensing units could be operated by means of pressurized gaseous or liquid operating fluids other than air and that such units need not necessarily be adapted to rotate. Additionally, it is important to note that the various components which are combined in the above described embodiments of the invention are not limited in novelty or utility to those particular combinations but may be employed advantageously in related instruments in various combinations and subcombinations with each other.

The invention has been described in detail with particular reference to illustrative preferred embodiments thereof, but it will be understood that variations and modifications can be effected within the spirit and scope of the invention as described hereinabove and as defined in the appended claims.

I claim:

1. An instrument for measuring torque, said instrument comprising:
   a. a torque sensing unit adapted to transmit torque, said torque sensing unit including;
      1. a shaft member,
      2. a sleeve member,
      3. sleeve support means supporting said sleeve member to said shaft member with a substantially tubular portion of said sleeve member extending along said shaft member in radially spaced concentric relation thereto,
      4. means defining a plurality of relatively small radial holes in said tubular portion of said sleeve member beyond said sleeve support means,
      5. a plurality of first reference members supported to said shaft member beyond said sleeve support means in radial relation to said shaft member, each of said first reference members including means defining a first reference surface located within a corresponding one of said radial holes in said sleeve member,
      6. a plurality of second reference members supported by said sleeve member, each of said second reference members including means defining a second reference surface located within a corresponding one of said radial holes in confronting spaced relation to the first reference surface located within that radial hole,
      7. adjusting means for moving said second reference members individually to provide selective adjustment of the spacing between each of said first reference surfaces and the corresponding second reference surface in confronting spaced relation thereto, and
   b. gaging means for measuring variations in the combined distance by which said first reference surfaces are spaced from the corresponding second reference surfaces in confronting spaced relation thereto.

2. An instrument according to claim 1 in which said second reference members comprise threaded reference screws adjustably supported in tangential relation to said sleeve member in mating threaded reference screw holes therein and facing in the same circumferential direction, said second reference surfaces being defined by the respective end faces of said threaded reference screws at right angles to the axes thereof and in parallel confronting relation to the corresponding first reference surfaces defined by said first reference members.

3. An instrument according to claim 1 in which all of said first reference surfaces face in the same circumferential direction, said instrument including nozzle means defining in each of said first reference members a tangentially facing orifice surrounded by the corresponding first reference surface of that reference member and passageway means providing passageways for conducting a pressurized fluid to all of such orifices, said gaging means being adapted to measure the combined distance by which said first reference surfaces are spaced from the corresponding second reference surfaces by determining the restriction to fluid flow imposed on said orifices by the respective second reference surfaces in confronting relation thereto.

4. An instrument according to claim 3 including valve means for selectively blocking the passage of pressurized fluid to each of said nozzle means.

5. An instrument according to claim 3 in which said gaging means is responsive to changes in fluid pressure within said passageways.

6. An instrument according to claim 3 in which said passageway means includes a central passageway extending along the axis of said shaft member, said shaft member also including a stiffness reducing hole larger than said central passageway and coaxial therewith, said stiffness reducing hole extending into the portion of said shaft member between said sleeve support means and said first reference members to reduce the torsional stiffness of that portion of said shaft member.

7. An instrument according to claim 3 in which said sensing unit includes a filter means adapted to filter fluid conducted to said nozzle means through said passageways.

8. An instrument according to claim 7 in which said filter means comprises an annular filter disk supported by a removable annular member surrounding said shaft member.

9. An instrument according to claim 3 in which said sensing unit includes sealing means defining a circuituous channel through which said fluid exhausts from said sensing unit.

10. An instrument according to claim 1 in which said shaft member, said sleeve member and said sleeve support means are integral with each other.

11. An instrument according to claim 1 in which said shaft member is provided with a central stiffness reducing hole extending along the axis of said shaft member into the portion thereof between said sleeve support means and said first reference members to reduce the resistance of that portion of said shaft member to torsional deflection.

12. An instrument according to claim 1 in which said sleeve support means comprises:
 a. an annular sleeve support collar integral with said shaft member, said sleeve support collar being supported at one end to said shaft member and extending axially of said shaft member in radially spaced relation thereto,
 b. means defining a first sleeve support surface on said sleeve support collar, and
 c. means defining a second sleeve support surface on said sleeve member engaged with said first sleeve support surface of said sleeve support collar.

13. An instrument according to claim 12 in which said first sleeve support surface comprises a peripheral surface of said sleeve support collar, said second sleeve support surface comprising an internal surface of said sleeve member in mating interference engagement with said peripheral surface of said sleeve support collar.

14. An instrument according to claim 1 in which said sensing unit is provided with at least three pairs of said first and second reference surfaces spaced in equiangular relation to each other with respect to the axis of said shaft member.

15. An instrument according to claim 1 including an indicator member provided with a deformable tip and means adjustably supporting said indicator member to said sleeve member to position said tip in adjustable spaced relation to a lateral surface of one of said first reference members opposite the corresponding second reference surface associated with that one of said first reference members.

16. An instrument according to claim 1 in which said sleeve support means comprises:
 a. an annular sleeve support flange integral with said shaft member,
 b. an annular sleeve support collar integral with said sleeve support flange and extending axially of said shaft member in radially spaced relation thereto,
 c. means defining a first sleeve support surface on said sleeve support collar, and
 d. means defining a second sleeve support surface on said sleeve member engaged with said first sleeve support surface of said sleeve support collar.

17. An instrument according to claim 1 in which said first reference members are of generally cylindrical configuration, and are supported by mating engagement with radial supporting holes in said shaft member.

18. An instrument according to claim 1 in which said sensing unit includes:
 a. an annular reference member support collar integral with said shaft member, said reference member support collar being supported at one end to said shaft member and extending axially of said shaft member in radially spaced relation thereto, and
 b. means supporting said first reference members from said reference member support collar.

19. An instrument according to claim 1 including substantially frictionless annular bearing means surrounding said shaft member and engaged with a portion of said sleeve member adjacent said reference members to prevent radial movement of that portion of said sleeve member relative to said shaft member without significantly effecting relative rotational movement between said shaft member and said sleeve member.

20. An instrument according to claim 1 in which said radial holes in said sleeve member are substantially cylindrical.

21. A torque sensing instrument comprising:
 a. a torque transmitting unit including:
  1. a support member,
  2. a sleeve member surrounding said support member,
  3. connecting means connecting said sleeve member and said support member, said connecting means being adapted to distort under the influence of torque transmitted through said unit to produce torque responsive relative rotation between said sleeve member and said support member,
  4. means defining a plurality of radial holes in said sleeve member radially adjacent said support member, 5. a plurality of first reference members radially supported by said support member, each of said first reference members including means defining a first reference surface located within a corresponding one of said radial holes in said sleeve member, 6. a plurality of second reference members supported by said sleeve member, each of said second reference members including means defining a second reference surface located within a corresponding one of said radial holes in confronting spaced relation to the first reference surface located within that radial hole, 7. adjusting means for moving said second reference members individually to provide selective adjustment of the spacing between each of said first reference surfaces and the corresponding second reference surface in confronting spaced relation thereto, and b. gaging means for measuring variations in the combined distance by which said first reference surfaces are spaced from the corresponding second reference surfaces in confronting spaced relation thereto.

22. A torque sensing instrument comprising:
a. a torque transmitting unit including:
1. a support member,
2. a sleeve member surrounding said support member,
3. connecting means connecting said sleeve member and said support member, said connecting means being adapted to distort under the influence of torque transmitted through said unit to produce torque responsive relative rotation between said sleeve member and said support member,
4. means defining a plurality of openings in said sleeve member adjacent said support member,
5. a plurality of first reference members supported by said support member, each of said first reference members including means defining a first reference surface located within a corresponding one of said openings in said sleeve member,
6. a plurality of second reference members supported by said sleeve member, each of said second reference members including means defining a second reference surface located within a corresponding one of said openings in adjacent spaced relation to the first reference surface located within that opening,
7. adjusting means for individually adjusting the spacing between each of said first reference surfaces and the corresponding second reference surface adjacent thereto, and b. gaging means for measuring variations in the combined distance by which said first reference surfaces are spaced from the corresponding adjacent second reference surfaces.

23. A torque measuring instrument for measuring the torque to which a rotatable torque transmitting member is subjected, said instrument comprising:
a. at least three sets of reference members each of which includes a nozzle member provided with an orifice facing circumferentially of said torque transmitting member and a restrictor member defining a restrictor surface confronting said orifice in spaced relation thereto,
b. nozzle support means supporting said nozzle members to a first portion of said torque transmitting member with no two of said nozzle members diametrically opposite each other relative to the rotational axis of said torque transmitting member,
c. restrictor member support means supporting said restrictor members to a second portion of said torque transmitting member adapted to rotate relative to said first portion thereof under the influence of torque transmitted through said torque transmitting member,
d. passageway means for conducting a pressurized fluid to the orifices of all of said nozzle members, and
e. gaging means for monitoring the flow capacity of all of said orifices while said shaft member is subjected to torque, said reference members being disposed relative to each other and to the axis of rotation of said torque transmitting member such that bending of said torque transmitting member along a bending plane coincident with said axis causes a reduction in the flow capacity of the orifices at one side of said plane and an equal counteracting increase in the flow capacity of the orifices at the opposite side of said plane.

24. An instrument according to claim 23 in which said nozzle members project radially outwardly relative to the rotational axis of said torque transmitting member.

25. An instrument according to claim 23 comprising three nozzle members projecting radially outwardly relative to said torque transmitting member at an angle of approximately 120° with respect to each other, said nozzle members being substantially in radial alignment with a common point along said axis of said torque transmitting member.

26. A torque measuring instrument for measuring the torque to which a rotatable torque transmitting member is subjected, said instrument comprising:
a. an odd numbered plurality of sets of reference members each of which includes a nozzle member provided with an orifice facing circumferentially of the said torque transmitting member and a restrictor member defining a restrictor surface confronting said orifice in spaced relation thereto,
b. nozzle support means supporting said nozzle members to a first portion of said torque transmitting member in substantially equiangular relation to each other relative to the rotational axis of said torque transmitting member, whereby no two of said nozzle members are diametrically opposite each other,
c. restrictor member support means supporting said restrictor members to a second portion of said torque transmitting member that is rotationally displaced relative to said first portion of said torque transmitting member by the torsional distortion experienced by said torque transmitting member under the influence of torque transmitting therethrough, d. passageway means for conducting a pressurized fluid to the orifices of all of said nozzle members, and e. gaging means for monitoring the combined fluid conducting capacity of all of said orifices while said torque transmitting member is subjected to transmitted torque, said reference members being disposed relative to each other and to the axis of rotation of said torque transmitting member such that bending of said torque transmitting member along a bending plane coincident with said axis causes a reduction in the flow capacity of the orifices at one side of said plane and an equal counteracting increase in the flow capacity of the orifices at the opposite side of said plane.

27. A torque sensing instrument comprising:
   a. A sensing unit including
      1. A shaft member having a segment of reduced diameter adjacent one end of said shaft member,
      2. An annular collar integral at one end thereof with said shaft member and extending toward said one end of said shaft member in spaced surrounding concentric relation to said segment,
      3. a tubular sleeve surrounding said shaft member in spaced concentric relation thereto, said sleeve being supported by said collar and extending axially along said shaft member beyond said collar toward the other end of said shaft member opposite said one end thereof, and
      4. means adapting said shaft member to be coupled to a device for transmitting torque through said shaft member, and
   b. gaging means for sensing relative rotational displacement produced by such torque between said sleeve and a predetermined increment of said shaft member between said collar and said other end of said shaft member, said gaging means comprising
      1. a plurality of nozzle members supported by said shaft member in radial relation to a point along the axis of said shaft member between said collar and said other end of said shaft member, said nozzle members being in substantially equiangular spaced relation to each other and including respective orifices facing in the same circumferential direction at equal distances from the axis of said shaft member,
      2. a plurality of restrictor members supported by said sleeve member in equally spaced confronting relation to the orifices of the corresponding ones of said nozzle members,
      3. passageway means for conducting a pressurized fluid to said orifices, and
      4. means for monitoring the escape of pressurized fluid from said passageway means through said orifices.

28. An instrument according to claim 27 in which the smallest external diameter of the portion of said shaft member surrounded by said sleeve beyond said collar is larger than the internal diameter of said collar.

29. A torque sensing unit comprising
   a. a rotatable assembly,
   b. a nozzle member carried by and rotatable with said rotatable assembly, said nozzle member including an orifice spaced radially outwardly from the axis of rotation of said rotatable assembly,
   c. a restrictor member adapted to restrict the fluid conducting capacity of said orifice in accordance with the rotational distortion experienced by a predetermined portion of said rotatable assembly under the influence of a torsional load transmitted therethrough,
   d. means defining a chamber within said rotatable assembly surrounding said orifice,
   e. first passageway means in said rotatable assembly defining a first opening to the exterior of said rotatable assembly radially inwardly from the rotational path of said orifice and in communication with said orifice through said nozzle member,
   f. second passageway means in said rotatable assembly defining a second opening to the exterior of said rotatable assembly radially inwardly from the rotational path of said orifice and in communication with said chamber, and
   g. rotary sealing means defining a stationary fluid passageway in fluid-tight communication with one of said openings.

* * * * *